US010703215B2

(12) United States Patent
Liang et al.

(10) Patent No.: US 10,703,215 B2
(45) Date of Patent: Jul. 7, 2020

(54) HYBRID POWERTRAIN SPEED CONTROL (71) Applicant: FORD GLOBAL TECHNOLOGIES, LLC, Dearborn, MI (US)

(72) Inventors: Wei Liang, Farmington Hills, MI (US); Rajit Johri, Canton, MI (US); Xiaoyong Wang, Novi, MI (US); Mark Steven Yamazaki, Canton, MI (US); Ming Lang Kuang, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 948 days.

(21) Appl. No.: 14/518,270

(22) Filed: Oct. 20, 2014

(65) Prior Publication Data
US 2016/0107633 A1    Apr. 21, 2016

(51) Int. Cl.
*B60W 20/00*    (2016.01)
*B60L 15/20*    (2006.01)
(Continued)

(52) U.S. Cl.
CPC ............... *B60L 15/20* (2013.01); *B60L 7/14* (2013.01); *B60L 7/26* (2013.01); *B60L 15/2009* (2013.01); *B60L 15/2054* (2013.01); *B60L 50/16* (2019.02); *B60L 58/12* (2019.02); *B60L 58/20* (2019.02); *B60W 10/06* (2013.01); *B60W 10/08* (2013.01); *B60W 10/115* (2013.01); *B60W 20/40* (2013.01); *B60W 30/181* (2013.01);
(Continued)

(58) Field of Classification Search
None
See application file for complete search history.

(56) References Cited

U.S. PATENT DOCUMENTS 5,637,987 A * 6/1997 Fattic ..................... B60K 6/365
                                                            180/65.25
6,226,585 B1   5/2001 Cullen
(Continued)

FOREIGN PATENT DOCUMENTS

| CN | 102245453 A | 11/2011 |
| CN | 102398590 A | 4/2012 |
| CN | 103161941 A | 6/2013 |
| CN | 103386962 A | 11/2013 |

OTHER PUBLICATIONS

Chinese Patent Office, Second Office Action for the corresponding Chinese Patent Application No. 201510683373.8, dated Aug. 5, 2019.

Primary Examiner — Todd M Melton
Assistant Examiner — Jason R Roberson
(74) Attorney, Agent, or Firm — David Kelley; Brooks Kushman P.C.

(57) ABSTRACT

In at least one embodiment, a vehicle powertrain includes an engine and an electric machine mechanically coupled by a clutch. The powertrain also includes a torque converter configured to fluidly couple the electric machine to an output shaft. A controller is programmed to command a rotational speed output of the electric machine to the torque converter based on a predicted torque delivered across the clutch. The controller is further programmed to modify the command based on a difference between the commanded rotational speed output and an actual rotational speed output of the electric machine.

13 Claims, 4 Drawing Sheets (51) Int. Cl.
*B60L 7/26* (2006.01)
*B60L 7/14* (2006.01)
*B60L 58/20* (2019.01)
*B60L 50/16* (2019.01)
*B60L 58/12* (2019.01)
*B60W 20/40* (2016.01)
*B60W 10/115* (2012.01)
*B60W 10/06* (2006.01)
*B60W 10/08* (2006.01)
*B60W 30/18* (2012.01)
*B60W 50/00* (2006.01)
*B60K 6/48* (2007.10)

(52) U.S. Cl.
CPC ... *B60K 2006/4825* (2013.01); *B60L 2210/10* (2013.01); *B60L 2210/40* (2013.01); *B60L 2240/461* (2013.01); *B60L 2240/463* (2013.01); *B60L 2240/486* (2013.01); *B60L 2240/507* (2013.01); *B60L 2240/545* (2013.01); *B60L 2240/547* (2013.01); *B60L 2240/549* (2013.01); *B60L 2240/80* (2013.01); *B60L 2250/26* (2013.01); *B60L 2260/26* (2013.01); *B60W 2050/0008* (2013.01); *B60W 2510/0275* (2013.01); *B60W 2510/081* (2013.01); *B60W 2520/04* (2013.01); *B60W 2520/10* (2013.01); *B60W 2710/028* (2013.01); *B60W 2710/081* (2013.01); *B60W 2710/083* (2013.01); *B60W 2710/085* (2013.01); *B60W 2710/1005* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y10S 903/902* (2013.01)

(56) References Cited

U.S. PATENT DOCUMENTS

| | | |
|---|---|---|
| 6,342,027 B1 * | 1/2002 | Suzuki ............ B60K 6/48 477/5 |
| 7,370,715 B2 | 5/2008 | Colvin et al. |
| 7,846,065 B2 | 12/2010 | Chen |
| 7,899,600 B2 | 3/2011 | Thor |
| 8,430,790 B2 | 4/2013 | Kobayashi et al. |
| 8,494,700 B2 | 7/2013 | Sime et al. |
| 8,538,643 B1 * | 9/2013 | Wang ............ B60W 10/08 340/453 |
| 8,808,138 B2 | 8/2014 | Nefcy et al. |
| 9,267,556 B2 | 2/2016 | Kim |
| 9,308,807 B2 | 4/2016 | Hane |
| 9,511,762 B2 | 12/2016 | Ooshima |
| 9,517,763 B2 | 12/2016 | Zhu |
| 9,573,586 B2 | 2/2017 | Matsu |
| 2001/0044683 A1 * | 11/2001 | Takaoka ............ B60K 6/48 701/22 |
| 2003/0006076 A1 | 1/2003 | Tamor |
| 2003/0098185 A1 | 5/2003 | Komeda et al. |
| 2007/0080005 A1 * | 4/2007 | Joe ............ B60K 6/48 180/65.245 |
| 2009/0020384 A1 * | 1/2009 | Gooden ............ F16H 61/62 192/3.3 |
| 2009/0255743 A1 | 10/2009 | Dilzer et al. |
| 2010/0108420 A1 | 5/2010 | Keiji |
| 2010/0323844 A1 | 12/2010 | Okubo et al. |
| 2012/0031201 A1 | 2/2012 | Sakuta |
| 2012/0059538 A1 | 3/2012 | Morris |
| 2012/0083385 A1 | 4/2012 | Smith et al. |
| 2012/0309587 A1 * | 12/2012 | Nozaki ............ B60K 6/48 477/5 |
| 2013/0211653 A1 | 8/2013 | Matsui et al. |
| 2013/0296113 A1 | 11/2013 | Nefcy et al. |
| 2014/0113766 A1 * | 4/2014 | Yagyu ............ B60W 20/30 477/5 |
| 2014/0257617 A1 * | 9/2014 | Klymenko ............ B60W 30/20 701/22 |

\* cited by examiner

HYBRID POWERTRAIN SPEED CONTROL

TECHNICAL FIELD

This disclosure relates to hybrid powertrain control systems.

BACKGROUND

Vehicles having automatic transmissions change gear ratios based on vehicle speed and driver acceleration demand. During deceleration automatic transmissions shift through progressively lower gear ratios. The smoothness of the shifting from a given gear to the next adjacent gear influences noise, vibration, and harshness as perceived by the driver.

Hybrid vehicles may employ one or more electric machines having a motor-generator in combination with an internal combustion engine. Depending on vehicle operating conditions, the electric machine may selectively alternate between serving as a motive power source, or a decelerating load upon the powertrain.

SUMMARY

In at least one embodiment, a vehicle powertrain includes an engine and an electric machine mechanically coupled by a clutch. The powertrain also includes a torque converter configured to fluidly couple the electric machine to an output shaft. A controller is programmed to command a rotational speed output of the electric machine to the torque converter based on a predicted torque delivered across the clutch. The controller is further programmed to modify the command based on a difference between the commanded rotational speed output and an actual rotational speed output of the electric machine.

In at least one embodiment, a method of controlling a hybrid powertrain output includes issuing a command for an engine to generate torque input to a clutch. The method also includes issuing a command for an electric machine to output rotational speed based on an estimated torque delivered across the clutch. The method further includes modifying the command to the electric machine based on a discrepancy between the commanded rotational speed and an actual rotational speed of the electric machine.

In at least one embodiment, a vehicle includes an engine for providing output torque to a clutch, and an electric machine for modulating torque received from the clutch and transferred to an output shaft. The vehicle also includes a controller programmed to command a rotational output speed of the electric machine based on a predicted torque delivered across the clutch. The controller is also programmed to modify the command based on the commanded output speed and an actual rotational speed of the output shaft, and disregard a discrepancy between the commanded output speed and the actual rotational speed of the output shaft in response to the rotational speed of the output shaft being less than a predetermined speed threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
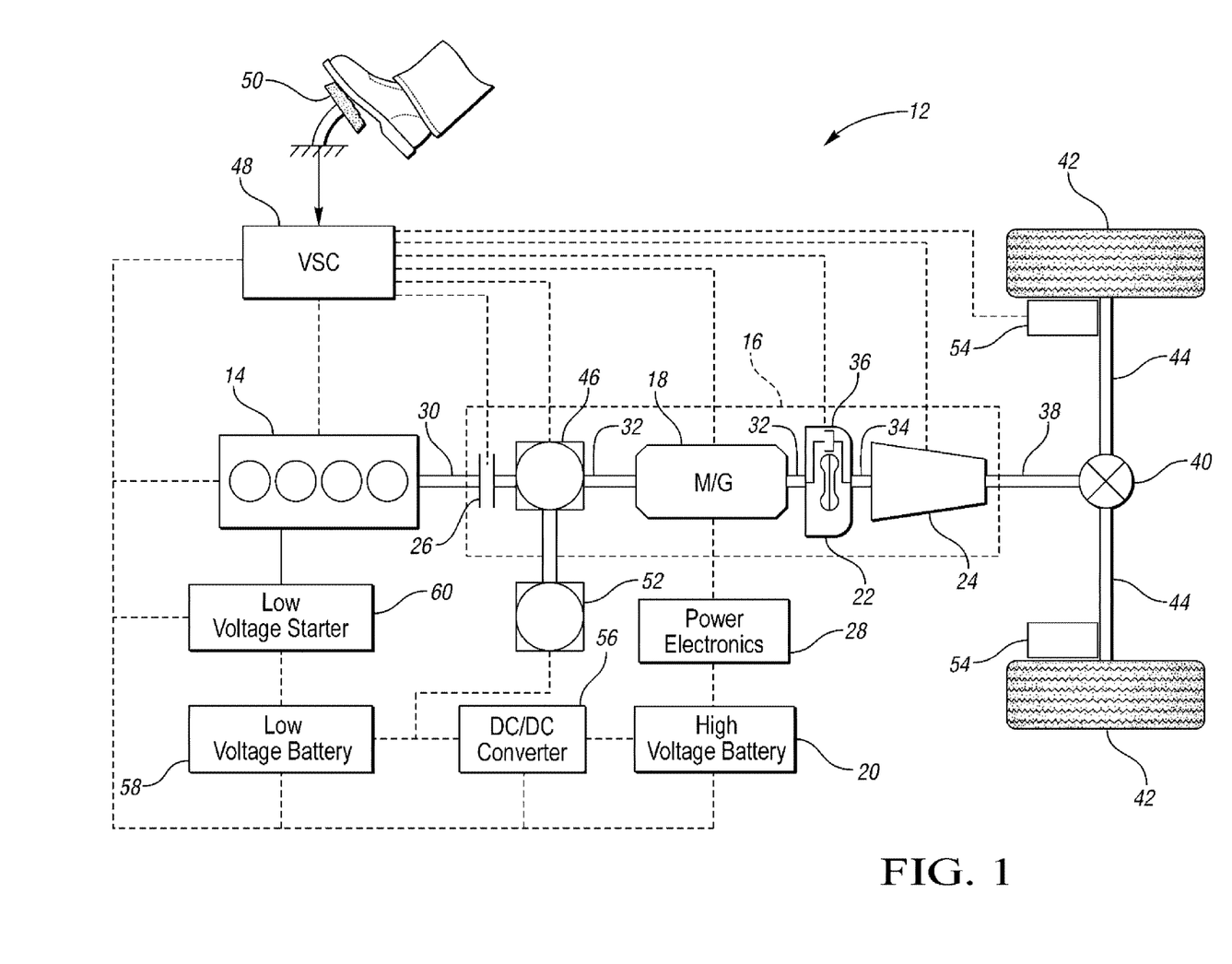
FIG. 1 is a schematic of a hybrid electric vehicle.

FIG. 1 schematically depicts a hybrid electric vehicle (HEV) 10, and illustrates representative relationships among vehicle components. Physical placement and orientation of the components within the vehicle may vary. The vehicle 10 includes a powertrain 12 having an engine 14 that drives a transmission 16. As will be described in further detail below, the transmission 16 includes an electric machine such as an electric motor/generator (M/G) 18, a torque converter 22, and a multiple step-ratio automatic transmission, or gearbox 24. There is also a high voltage traction battery 20 in connection with the M/G 18 for providing power to, and receiving power from, the M/G 18.

The engine 14 and the M/G 18 are both capable of providing motive power for the HEV 10. The engine 14 generally represents a power source which may include an internal combustion engine such as a gasoline, diesel, or natural gas powered engine, or a fuel cell. The engine 14 generates power and a corresponding output torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 28 condition direct current (DC) power provided by the battery 20 to the requirements of the M/G 18, as will be described below. For example, power electronics may provide three phase alternating current (AC) to the M/G 18. Additionally, there is a DC/DC converter 56 which steps down voltage from the high voltage battery 20 for powering other smaller vehicle loads. In at least one embodiment the DC/DC converter conditions power to supply an auxiliary transmission pump and a low voltage engine starter motor.

Transmission 16 is operable to deliver a variable gear ratio. The gearbox 24 may include internal gear sets (not shown) that are placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a gearbox input shaft 34 and the transmission output shaft 38. The gearbox 24 ultimately provides the powertrain output torque through the output shaft 38. For example, there may be two series of clutches, where each corresponds to odd-numbered or even-numbered gear sets. During shifting from a current gear ratio to an adjacent requested gear ratio, a clutch from the first series is concurrently disengaged while a clutch from the second series is engaged. Once the transfer from the first to the second clutch is completed as part of a gear shift, both the speed ratio and torque ratio between the transmission output shaft 38 and the transmission input shaft 34 changes according to the gear selection.

As further shown in the representative embodiment of FIG. 1, the output shaft 38 is connected to a differential 40.

The differential 40 drives a pair of wheels 42 via respective axles 44 connected to the differential 40. The differential transmits torque allocated to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The vehicle 10 further includes a foundation brake system 54. The brake system may comprise friction brakes suitable to selectively apply pressure by way of stationary pads attached to a rotor affixed to each wheel. The applied pressure between the pads and rotors creates friction to resist rotation of the vehicle wheels 42, and is thereby capable of slowing the speed of vehicle 10.

When the disconnect clutch 26 is at least partially engaged, power flow from the engine 14 to the M/G 18 or from the M/G 18 to the engine 14 is possible. For example, when the disconnect clutch 26 is engaged, the M/G 18 may operate as a generator to convert rotational energy provided by a crankshaft 30 through M/G shaft 32 into electrical energy to be stored in the battery 20. As discussed in more detail below, the rotational resistance imparted on the shaft through regeneration of energy may be used as a brake to decelerate the vehicle. The disconnect clutch 26 can also be disengaged to decouple the engine 14 from the remainder of the powertrain 12 such that the M/G 18 can operate as the sole drive source for the vehicle 10.

A main transmission pump 46 is used to operate the transmission 16 when the engine 14 is operating. Additionally, the main transmission pump 46 is powered by the vehicle engine 14. The main pump 46 draws fluid from a sump in the bottom of the transmission 16 and generates pressure within the hydraulic system. The main transmission pump 46 is generally powered by the M/G 18. Pressure is provided to the transmission and the disconnect clutch as long as the M/G is spinning at a high enough speed. When the M/G is stopped, an auxiliary electric pump 52 provides certain functions of the main transmission pump 46 and supports some limited transmission operation. Therefore the disconnect clutch 26, as well as other transmission mechanisms, can be engaged by the auxiliary pump 52 to maintain functionality during certain operating conditions.

Operation states of the powertrain 12 may be dictated by at least one controller. In at least one embodiment, there is a larger control system including several controllers. The individual controllers, or the control system, may be influenced by various other controllers throughout the vehicle 10, where a vehicle system controller (VSC) 48 operates at a higher hierarchy relative to other subservient controllers. The VSC 48 output may directly or indirectly dictate or influence a number of vehicle functions such as starting/stopping engine 14, operating the M/G 18 to provide wheel torque or recharge the traction battery 20, select or schedule transmission gear shifts, etc. For example, the VSC 48 may receive data from, and issue commands to, other subservient controllers that may operate lower in a controller hierarchy relative to the VSC 48. For example, other controllers which communicate with the VSC include a transmission control module (TCM), brake system control module (BSCM), a high voltage battery energy control module (BECM), an inverter system controller (ISC), as well as other controllers in communication which are responsible for various vehicle functions. In at least one embodiment, the BECM and the ISC are included within power electronics 28.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC 48 and other controllers communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the VSC 48 may communicate signals to and/or from electronics within the high voltage battery 20 and the power electronics 28. The power electronics 28 may comprise both the ISC and the BECM that manage power flow to and from the battery 20. Additionally, the VSC 48 may communicate with other vehicle controllers as discussed above, or directly with vehicle sensor and/or components including the engine 14, the braking system 54, the DC/DC converter 56, the low voltage battery 58, and starter 60. Although not explicitly illustrated, those of ordinary skill in the art will recognize various functions or components that may be controlled by the VSC 48 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, torque converter bypass clutch 36, and transmission gearbox 24, and the like. Sensors communicating input through an I/O interface may be used to indicate crankshaft position, engine rotational speed (RPM), M/G shaft speed, powertrain output shaft speed, wheel speeds, engine coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

The VSC 48 also includes a torque control logic feature. The VSC 48 is capable of interpreting driver requests based on several vehicle inputs. These inputs may include, for example, gear selection (PRNDL), accelerator pedal inputs, brake pedal input, battery temperature, voltage, current, and battery state of charge (SOC). The VSC 48 in turn may issue command signals to the power electronics 28 to influence the operation of the M/G 18.

The M/G 18 is also in connection with the torque converter 22 via shaft 32. Therefore the torque converter 22 is also connected to the engine 14 when the disconnect clutch 26 is at least partially engaged. The torque converter 22 includes an impeller fixed to the M/G shaft 32 and a turbine fixed to a transmission input shaft 34. The torque converter fluidly couples the electric machine to the output shaft. More specifically, the torque converter 22 provides a hydraulic coupling between shaft 32 and transmission input shaft 34. An internal bypass clutch 36 may also be provided torque converter such that, when engaged, clutch 36 frictionally or mechanically couples the impeller and the turbine of the torque converter 22, permitting more efficient power transfer. The torque converter 22 and its bypass clutch 36 may be replaced with a launch clutch to provide vehicle launch. In contrast, when the bypass clutch 36 is disengaged, the M/G 18 may be mechanically decoupled from the differential 40 and the vehicle axles 44. For example, during deceleration the bypass clutch 36 may disengage at low vehicle speeds, decoupling the engine from the transmission and driveline, to allow the engine to idle and operate at low vehicle speeds or stop. The timing and degree of the alternate operation of the M/G may serve to optimize fuel economy, and should coincide with the gear shifting operations of the transmission.

A driver of the vehicle 10 may provide input at accelerator pedal 50 and create a demanded torque, power, or drive command to propel the vehicle 10. In general, depressing and releasing the pedal 50 generates an accelerator input signal that may be interpreted by the VSC 48 as a demand for increased power or decreased power, respectively. Based at least upon input from the pedal, the controller 48 may allocate torque commands between each of the engine 14 and/or the M/G 18 to satisfy the vehicle torque output demanded by the driver. The controller 48 may also control the timing of gear shifts within the gearbox 24, as well as engagement or disengagement of the disconnect clutch 26 and the torque converter bypass clutch 36. The torque converter bypass clutch 36 can be modulated across a range between the engaged and disengaged positions. This may produce a variable slip in the torque converter 22 in addition to the variable slip produced by the hydrodynamic coupling between the impeller and the turbine. Alternatively, the torque converter bypass clutch 36 may be operated as either locked or open without using a modulated operating mode depending on the particular application.

The driver of vehicle 10 may additionally provide input at a brake pedal to create a vehicle braking demand. Depressing the brake pedal generates a braking input signal that is interpreted by controller 48 as a command to decelerate the vehicle. The VSC 48 may in turn issue commands to cause the application of negative torque to the powertrain output shaft 38. Additionally or in combination, the controller may issue commands to activate the brake system 54 to apply friction brake resistance to inhibit rotation of the vehicle wheels 42. The negative torque values provided by both of the powertrain and the friction brakes may be allocated to vary the amount by which each satisfies driver braking demand.

The M/G 18 may operate as a generator to convert kinetic energy from the powertrain 12 into electric energy to be stored in the battery 20. The M/G 18 may act as a generator while the engine 14 is providing the sole propulsion power for the vehicle 10, for example. The M/G 18 may additionally act as a generator during times of regenerative braking in which rotational energy from the spinning of the output shaft 38 is transferred back through the gearbox 24, and is converted into electrical energy for storage in the high voltage battery 20 or the low voltage battery 58.

It should be understood that the schematic illustrated in FIG. 1 is merely exemplary and is not intended to be limiting. Other configurations are contemplated that utilize selective engagement of both an engine and a motor to transmit through a transmission. Other such configurations are contemplated without deviating from the scope of the present disclosure.

Generally the electric machine has a higher torque bandwidth compared to the engine. Therefore the engine generally operates in torque control, and the electric machine may be operated using speed control to more precisely control overall powertrain output speed when needed. According to a powertrain of the present disclosure, the engine dictates the system power output and the electric machine regulates system speed. In this case, the electric machine is used to modulate overall speed output of the powertrain system.

Effectiveness of using the electric machine to modulate system speed can be monitored by measuring the torque and speed at impeller input of the torque converter 22. Generally, the torque of torque controller impeller may be described by equation (1) below.

$$\tau_{imp} = \tau_e + \tau_m \quad (1)$$

In equation (1), $\tau_{imp}$ is the impeller torque, $\tau_e$ is the engine output torque, and $\tau_m$ is the output torque of the electric machine. $\tau_m$ is positive if the electric machine assists the engine in vehicle propulsion. $\tau_m$ is negative when the electric machine operates as a generator and absorbs a portion of the engine output torque.

The dynamics that govern the output of the electric machine can be approximated by equation (2) below.

$$J_m \cdot \dot{\omega}_m = \tau_{clt} + \tau_m + \tau_{tc} \quad (2)$$

where $J_m$ is the electric machine inertia, $\dot{\omega}_m$ is rotational acceleration output from the electric machine, $\tau_{clt}$ is the clutch torque, and $\tau_{tc}$ is the torque loss at the torque converter. The clutch torque $\tau_{clt}$ will be the amount of torque applied to the electric machine, and depends on whether the clutch is open, closed, or in a slip mode.

In the simplest case, when the clutch is open, there is zero torque transferred across the clutch. If the clutch is locked, the clutch torque capacity is high enough so that the torque transferred through the clutch is equal to the engine brake torque minus engine inertia. Equation (3) below is a representative estimate of clutch torque in a locked state.

$$\tau_{clt} = \tau_e - J_e \cdot \dot{\omega}_e \quad (3)$$

If the clutch is in a slip mode the clutch torque equals the torque capacity, and is a function of the surface condition of the clutch plates $\lambda$, and the hydraulic pressure p applied across the clutch. Equation (4) below represents a typical relationship.

$$\tau_{clt} = f(\lambda, p) \quad (4)$$

As discussed above, engine torque output can overshoot and/or undershoot an ideal value as the state of the clutch changes. The powertrain system inertia varies significantly between electric only mode and hybrid vehicle modes. It is beneficial to use both feedforward information from the disconnect clutch as well as feedback of any electric machine speed error to manage powertrain speed output. According to aspects of the present disclosure, motor control may use a preliminary estimate of $\tau_{clt}$ as feedforward information to counteract changes in clutch torque related to state changes. Also, feedback from the actual output speed may be used to reject disturbances and limit error in speed output. A speed domain transfer function is represented below in equation (5).

$$\tau_m(s) = -\tau_{clt}^{est}(s) + G_m(s) \cdot (\omega_m^r(s) - \omega_m(s)) \quad (5)$$

$\tau_{clt}^{est}(s)$ is the estimated torque across the clutch, which is continuously adjusted by feedback terms based on the actual powertrain output. $\omega_m^r(s)$ is the commanded rotational speed of the electric machine, and $\omega_m(s)$ is the measured actual rotational speed output of the electric machine. The difference between the commanded electric machine speed and the actual electric machine speed is input into an adjustment portion of the algorithm, $G_m(s)$. The modified term is then used to enhance the estimated clutch torque.

Figure 2:
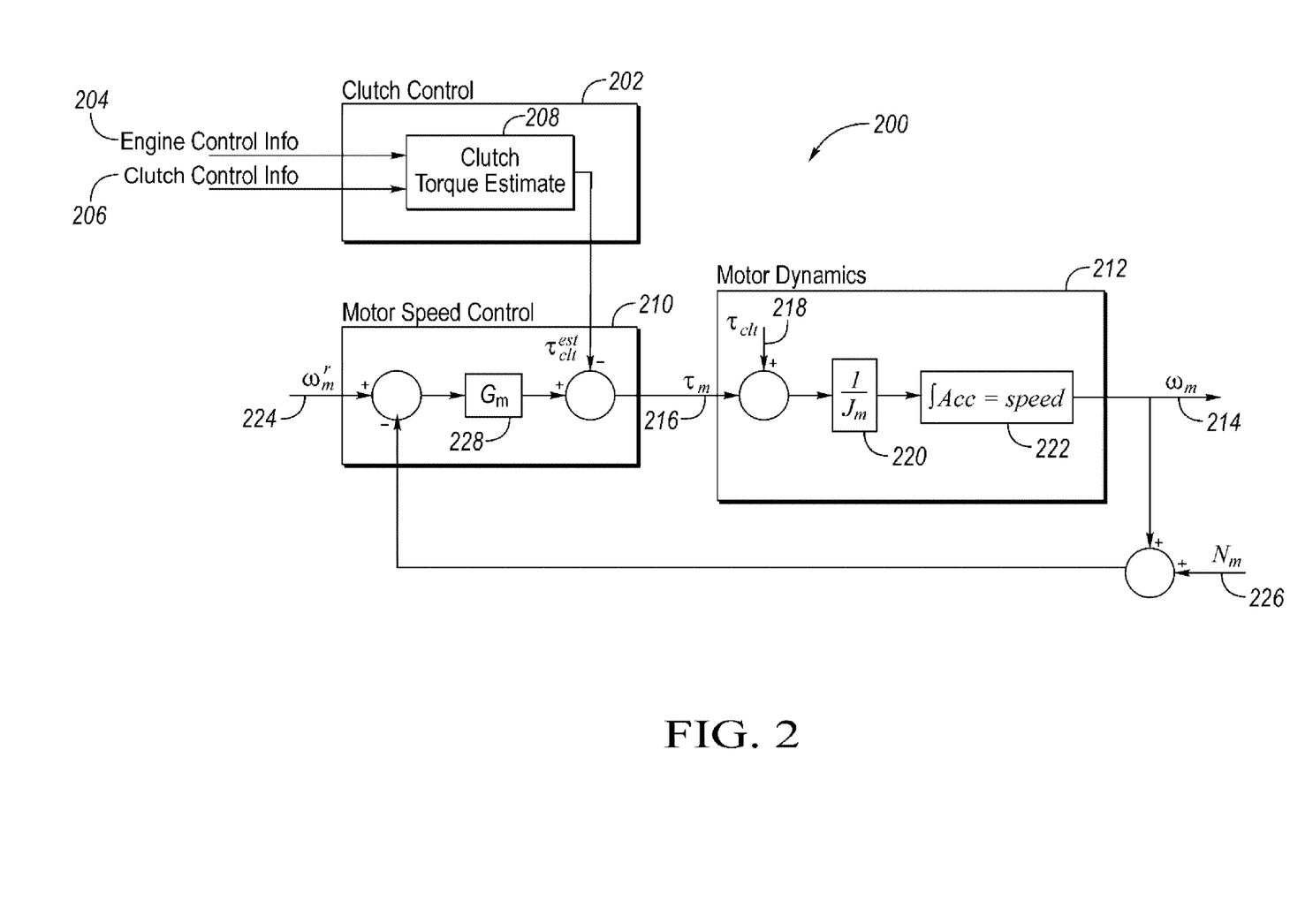
FIG. 2 is a system block diagram of a powertrain speed control algorithm.

The torque estimation algorithm is represented in the control system diagram of FIG. 2. System 200 represents information flow between controllers within a system that employs a combination of both feedforward and feedback information to control powertrain system speed.

A feedforward portion of the algorithm is represented at clutch control 202. Based on information from the engine 204 (i.e., output torque and speed) and information from the clutch 206 (i.e., lock state, surface condition, and hydraulic pressure), an estimate clutch torque 208 is provided. The motor control 210 uses the clutch torque estimate to generate a command to regulate rotational speed of the electric machine. In practice the clutch torque estimate 208 is often erroneous due to changes in system dynamics.

Specifically, motor dynamics 212 heavily affects the actual electric machine speed output 214. Actual electric machine output torque 216 and actual clutch torque 218 are affected by the electric machine inertia 220 and vehicle speed and acceleration profiles 222. The actual electric machine speed output 214 is measured and fed back to the motor speed control 210. Any error between the commanded rotational speed 224 of the electric machine and the actual speed output 214 of the electric machine is used to modify the speed command. The measured error, including any electric machine noise 226, is fed back to the motor speed control 210 to influence control system gain 228 and operate as error correction. This in turn improves the clutch torque estimate 208 minimizing the error between the speed command and the actual speed. Overall the feedback control operates to improve powertrain system robustness and transient response.

Generally, the feedback portion of the control algorithm comprises error correction to compensate for, and reduce speed discrepancies, improving robustness. However, the feedback portion is reactive, and there is some inherent time delay in the correction. The feedforward portion of the control algorithm predicts performance and avoids some portion of the output speed error. As inputs change, the downstream speed output is predicted before it arises. Feedforward control can compensate to some degree for known motor dynamic before the errors occur, reducing system delays. However feedforward control is most effective when system response is highly predictable. The advance estimation of clutch torque can carry error for several reasons. For example, the loss of a signal indicative of clutch pressure, loss of communication between controllers within the controller system, poor general signal conditions, and long communication delay all can contribute to errors in the clutch torque estimate. When both control types are used together, the feedforward component helps to provide rapid system response, and the feedback component helps to compensate for unavoidable errors in the powertrain system model. The method of the present controller provides a robust way to control hybrid powertrain output.

Figure 3:
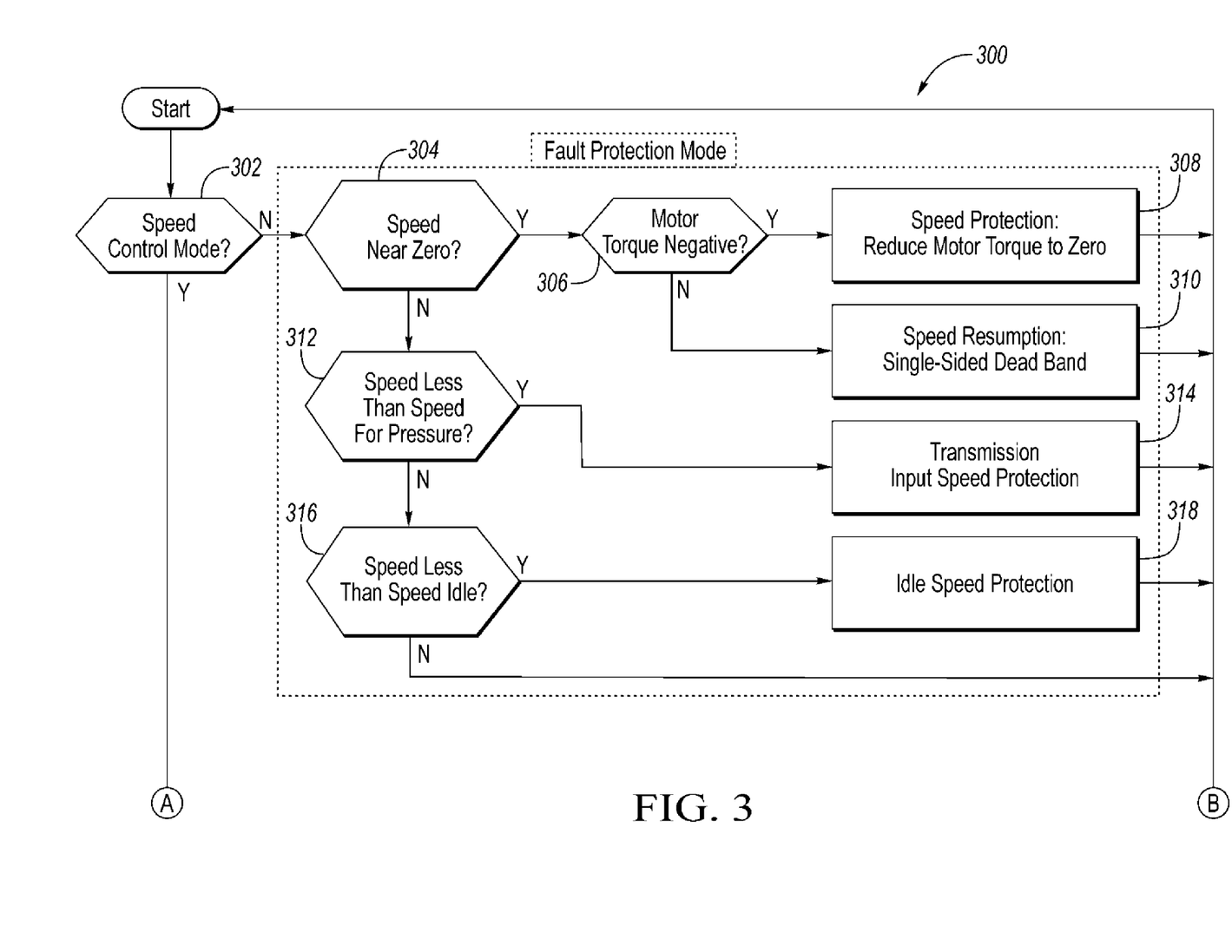
FIGS. 3 and 3A are a flowchart of a powertrain control method.
Figure 3A:
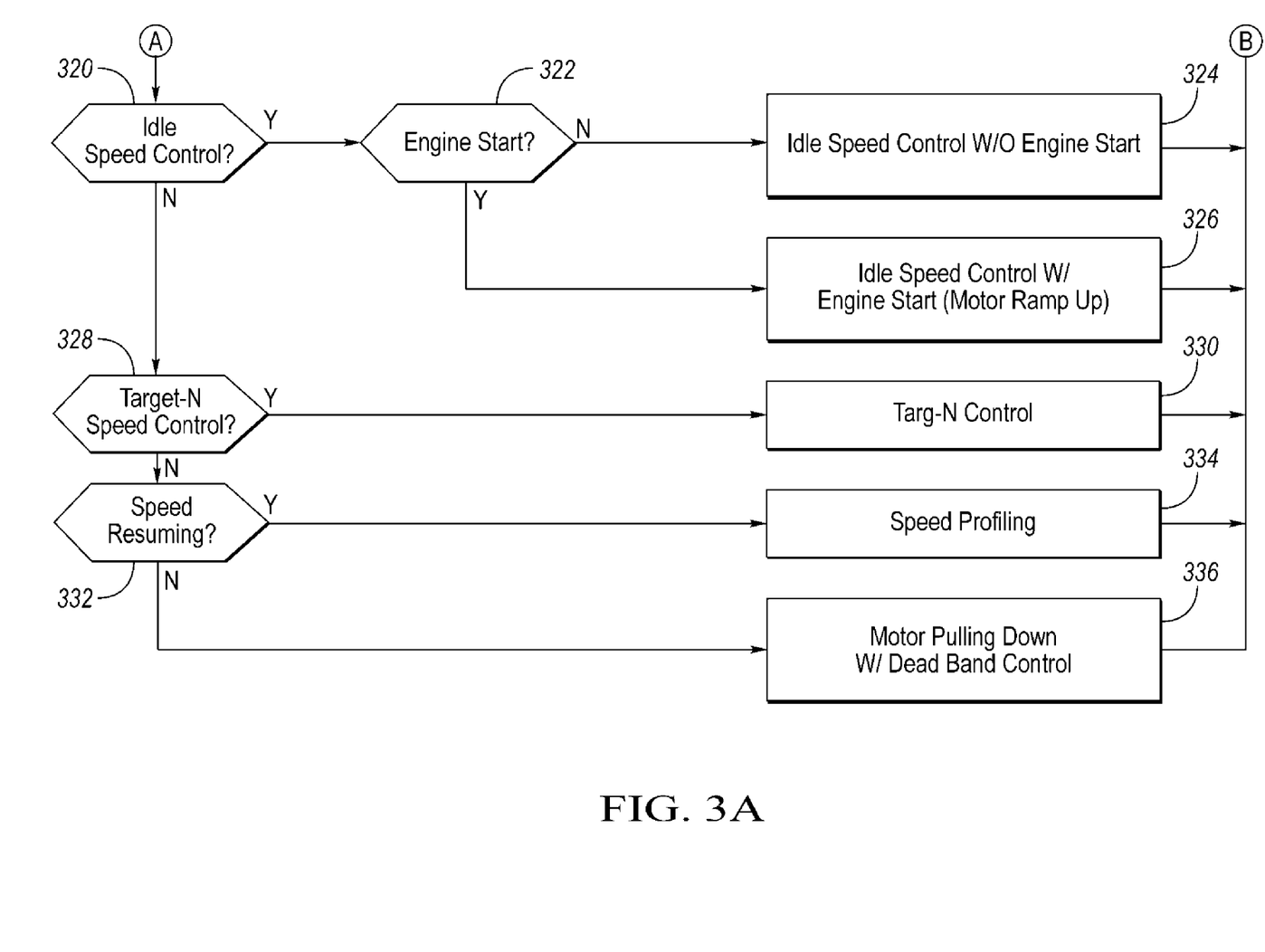

Speed control mode may be applied in the powertrain of the present disclosure to improve operation in several specific operation states. FIG. 3 is a flowchart of method 300 which illustrates an example of mode determination of speed control in the various powertrain operation states.

At step 302, if the powertrain is not in a formal speed control mode, electric machine speed control may still be used to protect against certain potential powertrain fault conditions to protect the engine and/or the transmission.

At step 304, if the electric machine speed is less than a first threshold, such as when vehicle is coming to a stop, the controller may command the electric machine to be stopped to save energy. At step 306, if the electric machine torque is negative, the controller may command the electric machine to smoothly ramp down to zero speed at 308. In at least one embodiment, the controller, in response to an imminent vehicle stop, causes a prompt ramp down by generating a smooth reduction of the speed target command for the electric machine. The controller may use the electric machine torque to regulate the speed until it is close enough to zero speed. A dead band of the speed control is implemented at very low speeds to fully cut the electric machine torque down to zero and let the electric machine speed reduce to stationary by itself with the help from the resistance of cooling oil.

At step 306, if the electric machine torque is positive, the dead band may be single-sided at step 310, also having a zero speed target. The advantage of dead band control at low speeds is that it ensures that the electric machine torque is zero when the electric machine is fully stopped. For example, electric machine rotational speeds less than about 20 rpm may be subject to the dead band to allow the speed to remain at zero when desired. At such low speeds, tighter control may be required because noise in speed measurement has a greater impact on system correction. The use of a dead band avoids small torque oscillation at zero speed due to measurement or calculation having accumulative errors. When otherwise using error correction at very low speeds, the errors on the electric machine speed can lead to ongoing small adjustments of torque, which are both unnecessary and inefficient.

At step 304, if the motor speed is greater than the first threshold, the controller may still protect for a minimum oil pressure in the transmission. For example, when the torque converter is closed, the impeller speed may be regulated to protect high priority operation of the transmission. The transmission requires the impeller speed to be higher than a value that can guarantee a sufficient oil pressure. Normally it is between 300-400 rpm. When the system is in torque control, inaccuracy in the torque output can lead to a drop in impeller speed. If at step 312, the impeller speed is less than a pressure threshold speed, the controller may invoke transmission speed protection at step 314 to increase the electric machine output to ensure that the impeller speed is greater than a predetermined minimum impeller speed. In a second example, a similar speed protection may be applied to control impeller speed when at zero to prevent the impeller speed from going negative in the event of multiple control/system failure.

At step 312, if the impeller speed is greater than the pressure threshold speed, the controller may still protect for a minimum idle speed of the engine and electric machine, even when the powertrain is in torque control mode. A normal operation in torque control mode will send torque command to both the engine and the motor. However, if the calculation is incorrect or the actuators are under-delivering or over-delivering, the combined torque could be in wrong direction which leads to a sharp drop of the speed below the idle, especially when the torque converter by-pass clutch is open. While the engine is running and the disconnect clutch is locked, the controller may command motor rotational speed to maintain engine speed above an idle speed threshold. If at step 316, the engine speed is less than an idle threshold speed, the controller may invoke idle speed protection at step 318 to increase the electric machine output to maintain the engine speed above the threshold.

According to aspects of the methods described herein, the controller may protect the powertrain speed from falling below a desired idle speed when the engine is on, from falling under the minimum speed for transmission pressure in EV mode, and from falling below zero in all use cases.

If at step 302, speed control is enabled, the controller may command the electric machine output speed to reduce powertrain harshness under various operating conditions. If at step 320, the vehicle powertrain is at idle, the controller may invoke idle speed control for both EV mode and HEV mode.

If at step 322, there is no imminent engine start, the feedforward term of the idle speed control may be zero when the engine is off. Therefore the electric machine torque is used to directly regulate the impeller torque at step 324, for example, by using the feedback calculation in equation (5) discussed above where the estimated clutch torque is zero.

While the powertrain is operated in EV mode, several conditions may invoke an engine start to supplement power. For example, when the vehicle is operated in EV mode at idle, a low SOC may require the engine to be started to avoid the SOC decreasing to less than a predetermined charge threshold. Similarly, the engine may be required to be started when the powertrain is at idle in EV mode is to provide power for high electrical loads, such as an air conditioner compressor. In a further example, a steep increase in driver acceleration demand, or accelerator pedal tip-in, may exceed the capabilities of the electric machine output torque. An engine start may be required to supplement propulsion torque. However, when the engine is started it may cause a significant load on the motor and disrupt system speed. If at step 322, there is an imminent engine start, the motor speed may be ramped up to prepare for disturbance rejection. For example, the disconnect clutch torque calculated by equation (4) may be used as the feedforward term. In at least one embodiment, the controller may command a ramp up of the rotational speed of the electric machine at step 326 in response to an imminent engine start event. The ramp up may be characterized by a speed profile having a rate of change that is less than a predetermined roughness threshold. This speed ramp up may operate to minimize discrepancies in powertrain output torque during the engine start event.

If the vehicle is in speed control mode at low speeds above idle at step 320, there may be a targeted electric machine rotational speed output used at step 328 in response to an imminent gear ratio shift of the transmission. The target speed control, which is referred to as "Target-N", is a special mode of the speed controller when the transmission initiates a downshift before the torque converter is fully open. The controller is programmed to maintain the impeller speed at a predetermined rotational speed, or Target-N, at step 330 to deliver a smooth torque transition during a gear shift event. In such case, the speed control gains will not be the same as those used in idle speed control discussed above. Target-N needs a set of much less aggressive gains to achieve the target of holding the impeller speed to minimize torque impact to the driveline. In at least one embodiment, Target-N is a fixed value used during the shift event to dictate motor speed to stabilize impeller speed. One example application is during a transmission downshift at very low vehicle speeds greater than idle. In another example, Target-N may include a speed profile that varies during the shift event to compensate for torque surges during the shift event. Similar to other aspects of the present disclosure, the speed profile may include a rate of change less than a roughness threshold to promote smooth transitions.

If at step 328, Target-N control is not being used, the controller may employ special conditions if the speed control is resuming from zero. If at step 332, the speed control is resuming, both speed resumption profile shaping may be used, as well as single-side dead band control. Both aspects are discussed in more detail below.

At step 334, the controller may command the initial speed to ramp up to according to a predetermined profiled to mitigate potential clunking due to backlash in the gear system, as well as shuffle due to driveline resonance. A control mechanism called input shaping can be applied to the motor target speed. The speed ramp up rate needs to be designed to be able to change with respect to the actual properties of the driveline system. Calibration or control parameter tuning can be used to adjust both of the speed ramp up rate and filtering so that a smooth torque response can be achieved.

Applying a speed profile to the electric machine output may also be used to coordinate with the transmission engagement when the gear lever is first shifted into a motive gear such as "Drive" or "Reverse," from a non-motive gear such as "Park" or "Neutral." The transmission oil pressure is generally proportional to the torque converter impeller speed. A desirable speed profile may lead to rapid resumption of the oil pressure while still allowing the transmission control to have sufficient time to engage all the clutches. Before the transmission engagement is finished, the impeller speed should not be raised again. Otherwise, a clunking feel may be observed by a vehicle operator.

At step 334, the controller may additionally invoke a single-side dead band control in response to the speed control resuming from zero. At low impeller speeds, the overall control architecture as shown in FIG. 2 may be changed to disable the feedforward term. The feedforward clutch torque estimate is not accurate at speeds less than the engine idle speed, therefore the reported engine torque may also be inaccurate. At impeller speeds less than the minimum engine combustion speed, engine start may also be inhibited. In this case, the feedforward clutch torque estimation term could lead to unexpected conditions such as an undesirable speed dip to negative from zero where speed resumption has been commanded. In order to deliver a smooth ramp up without the danger of leading to a negative impeller speed when the motor speed is low, the speed control is designed to be single-sided. In this way, only the motor torque is used to make the motor speed increase from zero to idle, at least to a value where the speed has increased to close enough to idle speed.

At step 332, if the speed control is not resuming, the controller may invoke a dead band control as discuss above during low speeds.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid powertrain control method comprising:
   issuing commands for an engine to generate and deliver an estimated torque across a clutch;
   issuing a command for an electric machine to output rotational speed based on the estimated torque delivered across the clutch;
   measuring actual rotational speed of the electric machine;
   providing feedback from a feedback loop indicating a discrepancy between the commanded and actual rotational speeds; and
   modifying the command for the electric machine to minimize the discrepancy.

2. The method of claim 1 further comprising, during vehicle travel speeds less than a speed threshold, issuing a command for the electric machine to output a rotational speed that is greater than a predetermined minimum rotational speed irrespective of the discrepancy.

3. The method of claim 1 wherein the hybrid powertrain includes a variable gear ratio transmission, and the method further comprising issuing a command for the electric machine to ramp up the rotational speed in response to the transmission shifted from a non-motive gear to a motive gear.

4. The method of claim 1 wherein the hybrid powertrain includes a torque converter configured to fluidly couple the electric machine to a powertrain output shaft, and in response to a downshift of a transmission gear ratio during vehicle travel speed less than a speed threshold, the command for the electric machine causes a predetermined rotational speed during a disengagement of the torque converter.

5. The method of claim 4 wherein the predetermined rotational speed of the electric machine comprises one of a constant speed or a speed profile having a rate of change less than a roughness threshold.

6. The method of claim 1 wherein the hybrid powertrain includes a torque converter configured to fluidly couple the electric machine to a powertrain output shaft, and during a powertrain idle condition, a combination of the commands for each of the engine and the electric machine causes an impeller speed of the torque converter to be greater than a predetermined minimum impeller speed.

7. The method of claim 1 further comprising, in response to the rotational speed of the electric machine being less than a threshold, disregarding the discrepancy between the commanded rotational speed and the actual rotational speed of the electric machine for a predetermined period of time.

8. A hybrid powertrain control method comprising:
   issuing commands for an engine to generate and deliver an estimated torque across a clutch;
   issuing a command for an electric machine to output rotational speed based on the estimated torque delivered across the clutch;
   measuring actual rotational speed of the electric machine;
   providing feedback from a feedback loop indicating a discrepancy between the commanded and actual rotational speeds;
   modifying the command for the electric machine to minimize the discrepancy; and
   in response to a downshift of a transmission gear ratio during vehicle travel speed less than a speed threshold, the command for the electric machine causes a predetermined rotational speed during a disengagement of a torque converter that is configured to fluidly couple the electric machine to a powertrain output shaft.

9. The method of claim 8 further comprising, during vehicle travel speeds less than a speed threshold, issuing a command for the electric machine to output a rotational speed that is greater than a predetermined minimum rotational speed irrespective of the discrepancy.

10. The method of claim 8 wherein the hybrid powertrain includes a variable gear ratio transmission, and the method further comprising issuing a command for the electric machine to ramp up the rotational speed in response to the transmission shifted from a non-motive gear to a motive gear.

11. The method of claim 8 wherein the predetermined rotational speed of the electric machine comprises one of a constant speed or a speed profile having a rate of change less than a roughness threshold.

12. The method of claim 8 wherein the hybrid powertrain includes a torque converter configured to fluidly couple the electric machine to a powertrain output shaft, and during a powertrain idle condition, a combination of the commands for each of the engine and the electric machine causes an impeller speed of the torque converter to be greater than a predetermined minimum impeller speed.

13. The method of claim 8 further comprising, in response to the rotational speed of the electric machine being less than a threshold, disregarding the discrepancy between the commanded rotational speed and the actual rotational speed of the electric machine for a predetermined period of time.

* * * * *